United States Patent Office 2,916,295
Patented Dec. 8, 1959

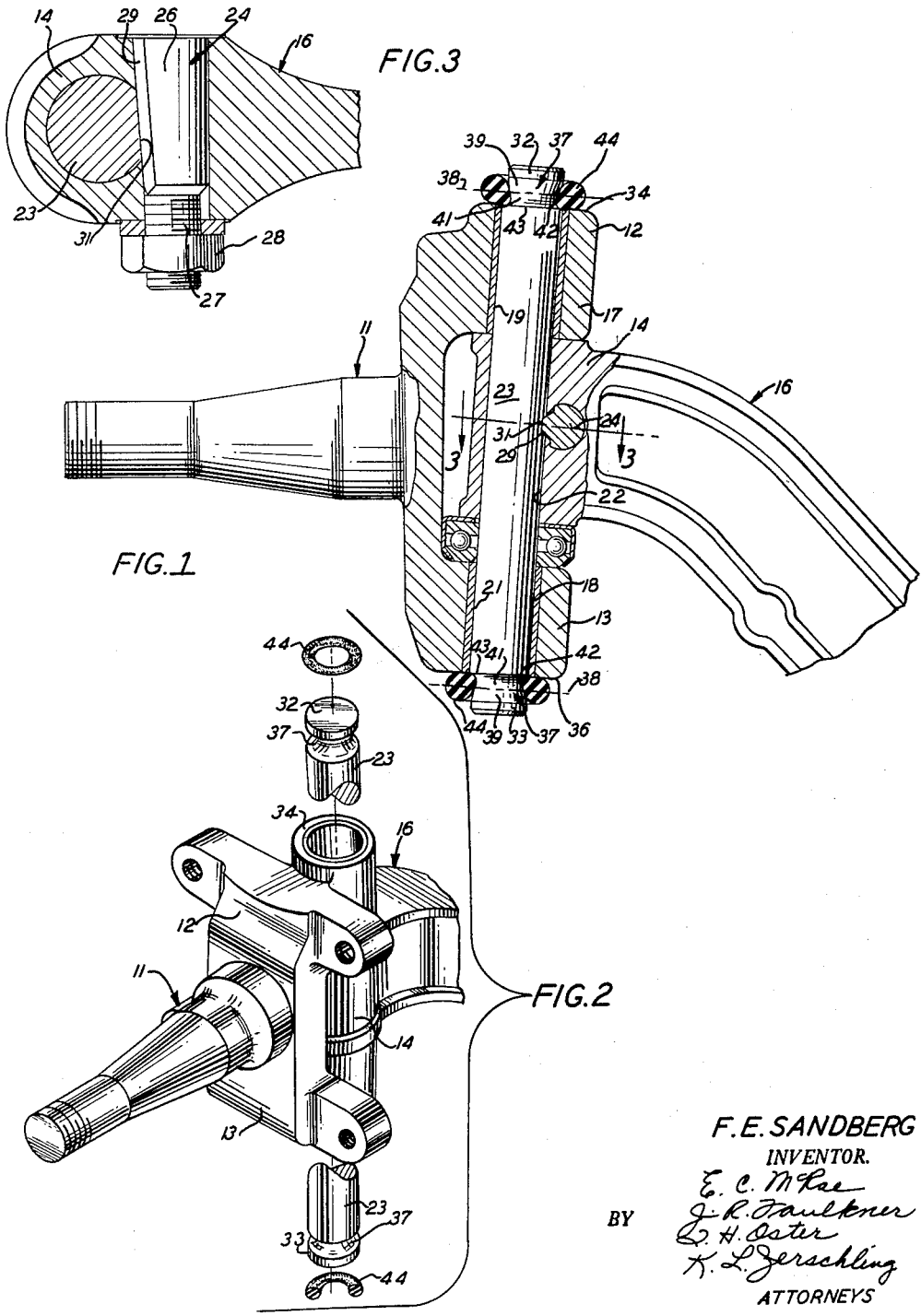

2,916,295

VEHICLE WHEEL SPINDLE

Fritz E. Sandberg, Detroit, Mich., assignor to Ford Motor Company, Dearborn, Mich., a corporation of Delaware Application September 30, 1957, Serial No. 687,210

1 Claim. (Cl. 280—96.1)

This invention relates generally to a motor vehicle wheel spindle assembly.

An object of the present invention is to provide a motor vehicle wheel spindle assembly utilizing a headless king pin which incorporates effective and economical sealing means to seal the assembly against the penetration of dust and dirt, and also to provide a seal against the loss of lubricant. Another object of the invention is to provide a spindle assembly having these features in which the bearings may be lubricated by high pressure means yet which will effectively retain its sealing effectiveness following the high pressure lubrication.

Still another object of the invention is to provide a motor vehicle wheel spindle assembly which will have effective sealing characteristics regardless of tolerance variations in manufacturing, and which is economical to manufacture and assemble.

Other objects and advantages of this invention will be made more apparent as this description proceeds, particularly when considered in connection with the accompanying drawings, wherein:

Figure 1 is a front elevational view, partly broken away and in section, of a wheel spindle assembly incorporating the present invention.

Figure 2 is a perspective exploded view of the construction shown in Figure 1.

Figure 3 is an enlarged cross section on the line 2—2 of Figure 1.

Referring now to the drawings, the reference character 11 indicates a wheel spindle having bifurcated flanges 12 and 13 embracing therebetween the outboard end 14 of a front axle 16. The bifurcated flanges of the spindle are formed with aligned bores 17 and 18 and receive antifriction bearings 19 and 21 respectively. The outboard end 14 of the axle is formed with a bore 22 corresponding in diameter to the inside diameter of the bearings 19 and 21.

A king pin 23 extends through the aligned openings provided in the wheel spindle and the axle, and is locked in position in the bore 22 of the axle by means of a locking pin 24. As seen in Figure 3, the locking pin 24 has a tapered body portion 26 received within a corresponding opening in the axle, and a threaded end portion 27 engaged by a nut 28 to permit axial tightening of the locking pin. The locking pin has a tooth 29 formed at one edge thereof which is received within a correspondingly shaped slot 31 provided in the central portion of the king pin 23. It will be apparent that the locking pin 24 not only holds the king pin against rotation within the axle, but also retains it against axial displacement with respect thereto.

The upper and lower ends 32 and 33 of the king pin project beyond the opposite end surfaces 34 and 36 of the bifurcated flanges 12 and 13 respectively of the spindle. Each projecting end portion is formed with a groove 37 of identical configuration.

In cross section, each groove 37 is generally of arcuate shape, but it will be noted that it is not of semi-circular shape nor is it symmetrical about its center line 38. The outer portion 39 of each groove is tapered gradually toward the center line, while the inner end 41 is more sharply curved. As a result, the deepest portion 42 of each groove is offset axially with respect to the center line 38 of the groove and is located approximately midway between the center line 38 and the inner boundary 43 of the groove. It will be noted that the king pin 23 is so designed that the dimension between the inner edges 43 of the grooves 37 is slightly less than the distance between the opposite end surfaces 34 and 36 of the wheel spindle.

Resilient sealing rings 44 are assembled in the peripheral grooves 37 of the king pin. These rings may be of rubber or a synthetic resilient material and are preferably of circular cross section. Standard O rings may be used for this purpose. The sealing rings 44 have, in their free state, an internal diameter less than the diameter of the base of the peripheral grooves 37 so that when assembled on the king pin they will be distorted and will fit snugly in the grooves. Due to the particular configuration of the grooves 37, as shown in Figure 1, the resilient sealing members 44 will be distorted into the deep portions 42 of the grooves and consequently will be urged into sealing engagement with the end surfaces 34 and 36 of the bifurcated flanges 12 and 13 of the wheel spindle.

The arrangement described above automatically compensates for slight manufacturing variations in the various parts of the spindle assembly, and provides adequate sealing characteristics even though the permitted dimensional tolerances of the parts may be stacked in one direction. The resilient sealing rings 44 will thus be effective to provide effective seals between the ends of the king pin and the adjacent ends of the wheel spindle.

Wheel spindle assemblies of this type are conventionally lubricated by high pressure lubrication means. With the present construction, if an excess of lubrication is supplied to the bearings of the spindle assembly under high pressure it will displace the sealing rings 44 from seating engagement with the end faces 34 and 36 of the spindle, permitting the excess lubricant to escape. As the supply of pressure lubricant is stopped the tension of the distorted sealing rings will return them to their normal positions in sealing engagement with the spindle.

It will be apparent that with the construction described, the sealing rings are effective to prevent the entrance of dust or other foreign material into the spindle assembly and at the same time will prevent the escape of lubricant from the spindle assembly except during high pressure lubrication.

Since the king pin 23 is headless and has a maximum diameter no greater than the aligned openings in the spindle and axle, it may be economically manufactured and may be assembled or removed from either end of the spindle. If desired, the end portions 32 and 33 of the king pin may be slightly smaller in diameter than the main body of the king pin to allow for slight distortion which may result from efforts to remove the king pin by hammering. The assembly of the unit is easily accomplished by, first, inserting the king pin from either end of the spindle, second, locking it in place with the locking pin 24, and, third, snapping the resilient rings 44 over the projecting ends of the king pin into the peripheral grooves 37 formed therein. The disassembly is accomplished in the reverse fashion.

It will be understood that the invention is not to be limited to the exact construction shown and described,

What is claimed is:

In a spindle assembly for a motor vehicle wheel, an axle, a bifurcated spindle embracing the end of said axle, said spindle and said axle having aligned bores therethrough, a headless kingpin extending through said aligned bores and forming a pivotal connection between said spindle and said axle, locking means securing said kingpin to said axle, said kingpin having end portions projecting beyond the opposite ends of said bifurcated spindle, each projecting end portion of said kingpin having a peripheral groove formed therein, said peripheral grooves being positioned immediately adjacent the opposite ends of said bifurcated spindle and being of non-symmetrical curved cross section with a tapered conical portion between the center line of each groove and the outer end of the groove and with a deep arcuate portion between the center line of each groove and the inner end of the groove, each of said grooves slightly overlapping the adjacent end of the spindle so that the distance between the adjacent ends of the two grooves in the kingpin is slightly less than the distance between the opposite ends of the spindle, and a resilient sealing ring in each of said grooves, each of said sealing rings having a circular cross section in its free position and a free inside diameter smaller than the smallest diameter of said kingpin at the deepest part of the arcuate portion of the groove, said sealing rings being deformed when assembled to said kingpin and conforming to the non-symmetrical shape of said grooves and effecting a direct pressure engagement with the opposite ends of said spindle to seal against the entrance of foreign matter and the escape of lubricant.

References Cited in the file of this patent

UNITED STATES PATENTS

| | | |
|---|---|---|
| 1,705,630 | Woolson | Mar. 19, 1929 |
| 1,810,093 | Timson | June 16, 1931 |
| 2,615,765 | Venable | Oct. 28, 1952 |
| 2,710,206 | Huber | June 7, 1955 |
| 2,773,368 | Slaght | Dec. 11, 1956 |